United States Patent
Yun et al.

(10) Patent No.: US 11,949,329 B2
(45) Date of Patent: Apr. 2, 2024

(54) INDUCTION HEATING COOKING APPARATUS

(71) Applicant: Samsung Electronics Co., Ltd., Suwon-si (KR)

(72) Inventors: Changsun Yun, Suwon-si (KR); Hyunkwan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 524 days.

(21) Appl. No.: 17/261,739

(22) PCT Filed: Jun. 7, 2019

(86) PCT No.: PCT/KR2019/006885
§ 371 (c)(1),
(2) Date: Jan. 20, 2021

(87) PCT Pub. No.: WO2020/027429
PCT Pub. Date: Feb. 6, 2020

(65) Prior Publication Data
US 2021/0345459 A1    Nov. 4, 2021

(30) Foreign Application Priority Data

Aug. 2, 2018 (KR) .......................... 10-2018-0090435

(51) Int. Cl.
*H05B 6/06* (2006.01)
*H02M 1/00* (2006.01)
(Continued)

(52) U.S. Cl.
CPC ........... *H02M 1/44* (2013.01); *H02M 1/0064* (2021.05); *H05B 6/062* (2013.01); *H05B 6/1272* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,537,044 A | * | 7/1996 | Stahl | G01R 31/14 307/107 |
| 2002/0136033 A1 | * | 9/2002 | Hirokawa | H02M 3/28 363/21.01 |

(Continued)

FOREIGN PATENT DOCUMENTS

| | | |
|---|---|---|
| JP | 5664654 | 2/2015 |
| JP | WO2017/010031 | 1/2017 |

(Continued)

OTHER PUBLICATIONS

International Search Report dated Oct. 8, 2019 from International Application No. PCT/KR2019/006885, 4 pages.

(Continued)

*Primary Examiner* — Dana Ross
*Assistant Examiner* — Kuangyue Chen
(74) *Attorney, Agent, or Firm* — STAAS & HALSEY LLP (57) ABSTRACT

Disclosed is an induction heating cooking apparatus. The induction heating cooking apparatus includes a countertop having plurality of cooking areas in which each cooking container can be seated, a plurality of coils provided under the countertop, a main substrate, and an auxiliary substrate separated from the main substrate. The main substrate is provided with a plurality of inverters each connected to a plurality of coils, a noise filter providing a plurality of inverters with a voltage from which noise from an external power supply is removed, and a plug connectable to the external power supply. The auxiliary substrate is provided with an input terminal to which the power line from the plug is connected, an output terminal to which the power line facing the noise filter is connected, and a discharge circuit part connected to the noise filter.

9 Claims, 11 Drawing Sheets

(51) Int. Cl.
H02M 1/44 (2007.01)
H05B 6/12 (2006.01)

(56) References Cited

U.S. PATENT DOCUMENTS

| | | |
|---|---|---|
| 2013/0100496 A1 | 4/2013 | Kim |
| 2013/0147440 A1* | 6/2013 | Shiroyama ............. G01R 31/40 |
| | | 320/166 |
| 2015/0263542 A1 | 9/2015 | Sato et al. |
| 2018/0168005 A1* | 6/2018 | Yun ........................ H05B 6/065 |

FOREIGN PATENT DOCUMENTS

| | | |
|---|---|---|
| KR | 10-2014-0088324 | 7/2014 |
| KR | 10-1487054 | 1/2015 |
| KR | 10-2017-0016608 | 2/2017 |
| KR | 10-1768693 | 8/2017 |
| KR | 10-2018-0065814 | 6/2018 |

OTHER PUBLICATIONS

Korean Office Action dated Jan. 12, 2023 for Korean Application No. 10-2018-0090435.

* cited by examiner

INDUCTION HEATING COOKING APPARATUS

CROSS-REFERENCE TO RELATED APPLICATION

This application is a U.S. National Stage Application which claims the benefit under 35 U.S.C. § 371 of International Patent Application No. PCT/KR2019/006885 filed on Jun. 7, 2019, which claims foreign priority benefit under 35 U.S.C. § 119 to Korean Patent Application No. 10-2018-0090435, filed on Aug. 2, 2018, the disclosures of which are herein incorporated by reference.

BACKGROUND

1. Field

The disclosure relates to an induction heating cooking apparatus capable of simultaneously securing safety and design optimization.

2. Discussion of Related Art

An induction heating cooking apparatus is a cooker capable of cooking food contained in a cooking container by heating the cooking container by applying an induction current to an induction coil. The induction heating cooking apparatus is produced in a so-called direct connection type or plug type depending on the power supply environment. For example, the direct connection type is produced to have a two-phase, five-wire power line, whereas the plug type is produced to have a single-phase three-wire power line.

In the plug type, a plug is connected to an outlet supplying external power, and AC power is supplied through a power line connected to the plug. Meanwhile, the induction heating cooking apparatus may include an electromagnetic interference (EMI) filter for removing noise mixed with AC power.

However, since the EMI filter of the induction heating cooking apparatus has a large-capacity capacitor, when the plug is disconnected from the outlet, there may be a safety problem that a voltage charged in the capacitor applies an electric shock to a user. Therefore, in designing the induction heating cooking apparatus, there is a need to discharge charges charged in the capacitor so that a residual voltage of the EMI filter meets a predetermined reference limit voltage when the plug is disconnected. Further, even if a discharging means such as a resistor for discharging the charges charged in the capacitor is considered, when a low power operation is required, for example, in a standby mode, power consumption generated by the discharging means needs to be minimized.

In addition, when there are two or more induction coils, the plug type has a terminal block for branching the power line from the plug into the two or more induction coils. However, the space occupied by the device causes the problem of making the space narrow and complicating the design, such as the arrangement of other components and the wire connection between the components.

As described above, the plug-type induction heating cooking apparatus has the safety problem that occurs when the plug is disconnected and the problem that causes the design complexity due to the terminal block. Therefore, there is a need for an induction heating cooking apparatus that is optimally designed to be safer and more space efficient.

SUMMARY

The disclosure is to provide an induction heating cooking apparatus capable of simultaneously securing safety and design optimization.

The disclosure is to provide an induction heating cooking apparatus capable of minimizing power consumption while securing safety and design optimization.

According to an embodiment of the disclosure, an induction heating cooking apparatus includes: a countertop configured to have a plurality of cooking areas in which each cooking container is seated; a plurality of coils configured to be provided under the countertop for each of the plurality of cooking areas; a plurality of inverters configured to be provided on a main substrate and connected to each of the plurality of coils; a noise filter configured to provide the plurality of inverters with a voltage from which noise from an external power supply is removed; a plug configured to be connected to the external power supply; an input terminal configured to be separated from the main substrate and connected to a power supply line from the plug; an output terminal configured to be connected to the power supply line facing the noise filter; and an auxiliary substrate configured to be provided with a discharge circuit part connected to the noise filter.

The noise filter may include a first noise filter and a second noise filter corresponding to each of the plurality of inverters, and a power line from the output terminal toward the noise filter may include a first power line and a second power line branched and connected to the first noise filter and the second noise filter, respectively.

The noise filter may include a capacitor connected in parallel to the external power supply, and the discharge circuit part may include a discharge resistor for discharging a voltage stored in the capacitor.

The discharge circuit part may further include a switching unit configured to be provided between the noise filter and the discharge resistor and switched on in response to an input cutoff of the external power supply.

The auxiliary substrate may further include a fuse connected in series to the discharge resistor.

The auxiliary substrate may further include a varistor connected in parallel to the discharge resistor.

The noise filter may be provided on the main substrate.

The noise filter may be provided on the auxiliary substrate.

The auxiliary substrate may further include a fixing hole, through which a fixing means for fixing the auxiliary substrate penetrates, around the main substrate.

The input terminal and the output terminal may be a tap type.

According to the disclosure, it is possible to provide the induction heating cooking apparatus capable of simultaneously securing the safety and design optimization.

In addition, according to the disclosure, it is possible to provide the induction heating cooking apparatus capable of minimizing the power consumption while securing the safety and design optimization.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Hereinafter, embodiments according to the disclosure will be described in detail with reference to the accompanying drawings. The description of embodiments below references matters described in the accompanying drawings, and the same reference numerals or symbols illustrated in each drawing indicate components that perform substantially the same operation. In the disclosure, at least one of a plurality of elements refers to not only all of the plurality of components, but also each one or all combinations thereof excluding the rest of the plurality of components.

Figure 1:
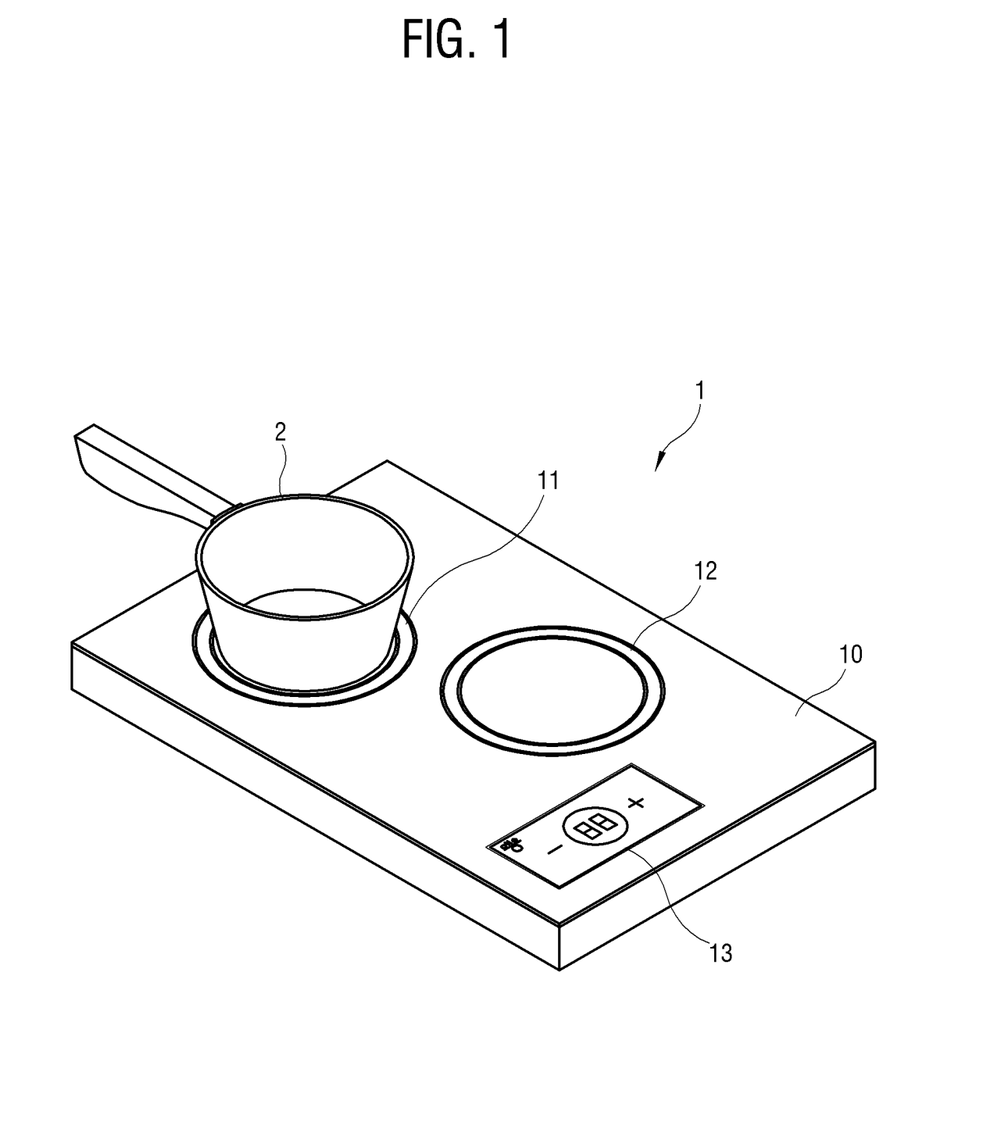
FIG. 1 is a diagram illustrating an induction heating cooking apparatus according to an embodiment of the disclosure.
Figure 2:
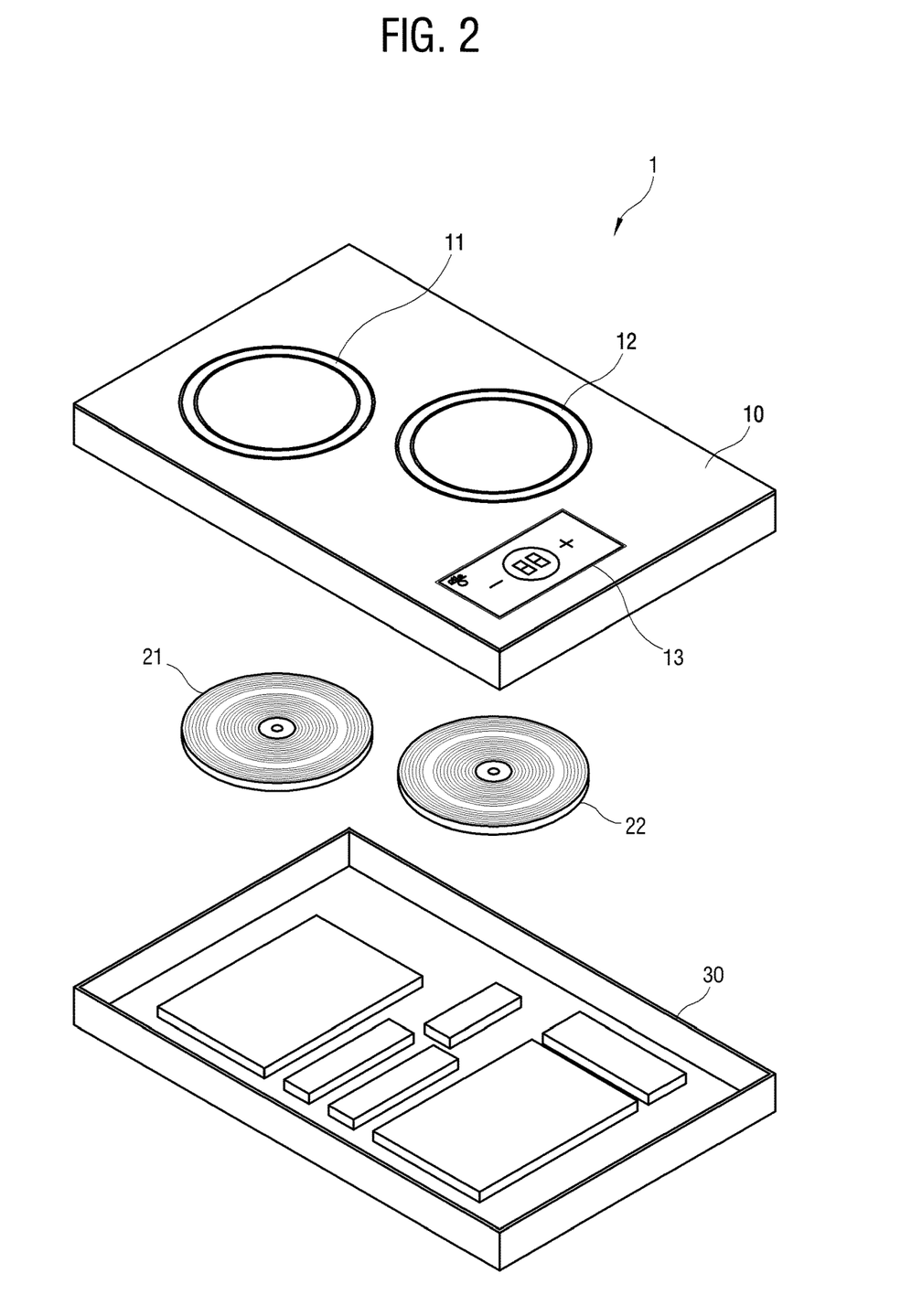
FIG. 2 is a diagram illustrating an inside of the induction heating cooking apparatus according to the embodiment of the disclosure.

FIGS. 1 and 2 are diagrams illustrating an induction heating cooking apparatus according to an embodiment of the disclosure. As illustrated in FIGS. 1 and 2, an induction heating cooking apparatus 1 includes a countertop 10 and induction coils 21 and 22. The countertop 10 has cooking areas 11 and 12 on which a cooking container 2 is placed, and the induction coils 21 and 22 may be provided under the cooking areas 11 and 12 to heat the cooking container 2 placed on the countertop 10.

Briefly explaining the principle that the cooking container 2 is heated by the induction coils 21 and 22, when a current is applied to the induction coils 21 and 22, a magnetic field passing through the inside of the induction coils 21 and 22 is induced. The magnetic field induced by the induction coils 21 and 22 passes through a bottom surface of the cooking container 2, and an eddy current that rotates around the magnetic field is generated inside the bottom surface of the cooking container 2. The cooking container 2 is heated by the eddy current, and food contained in the heated cooking container 2 is cooked.

The induction heating cooking apparatus 1 has a main body 30 that supports the countertop 10 and accommodates the induction coils 21 and 22 therein. The main body 30 may have a switch for supplying current to the induction coils 21 and 22 based on AC power supplied from an external power supply, an integrated circuit including the switch, and the like, and may further include a printed circuit board provided with an integrated circuit, and the like.

However, the induction heating cooking apparatus 1 may further include, but not limited thereto, components other than the above components or may exclude some of the above components. For example, the induction heating cooking apparatus 1 may further include a processor or CPU capable of performing operation control over an overall configuration, and a memory storing programs and data for controlling the operation.

In addition, the countertop 10 may further include a user interface 13 for receiving a control command from a user and displaying operation information, and the main body 30 may further include at least one heat sink for heat dissipation, a cooling fan for providing cooling air to the heat sink, or an auxiliary power supply unit for stably supplying power. The auxiliary power supply unit may be implemented as a switching mode power supply (SMPS).

Figure 3:
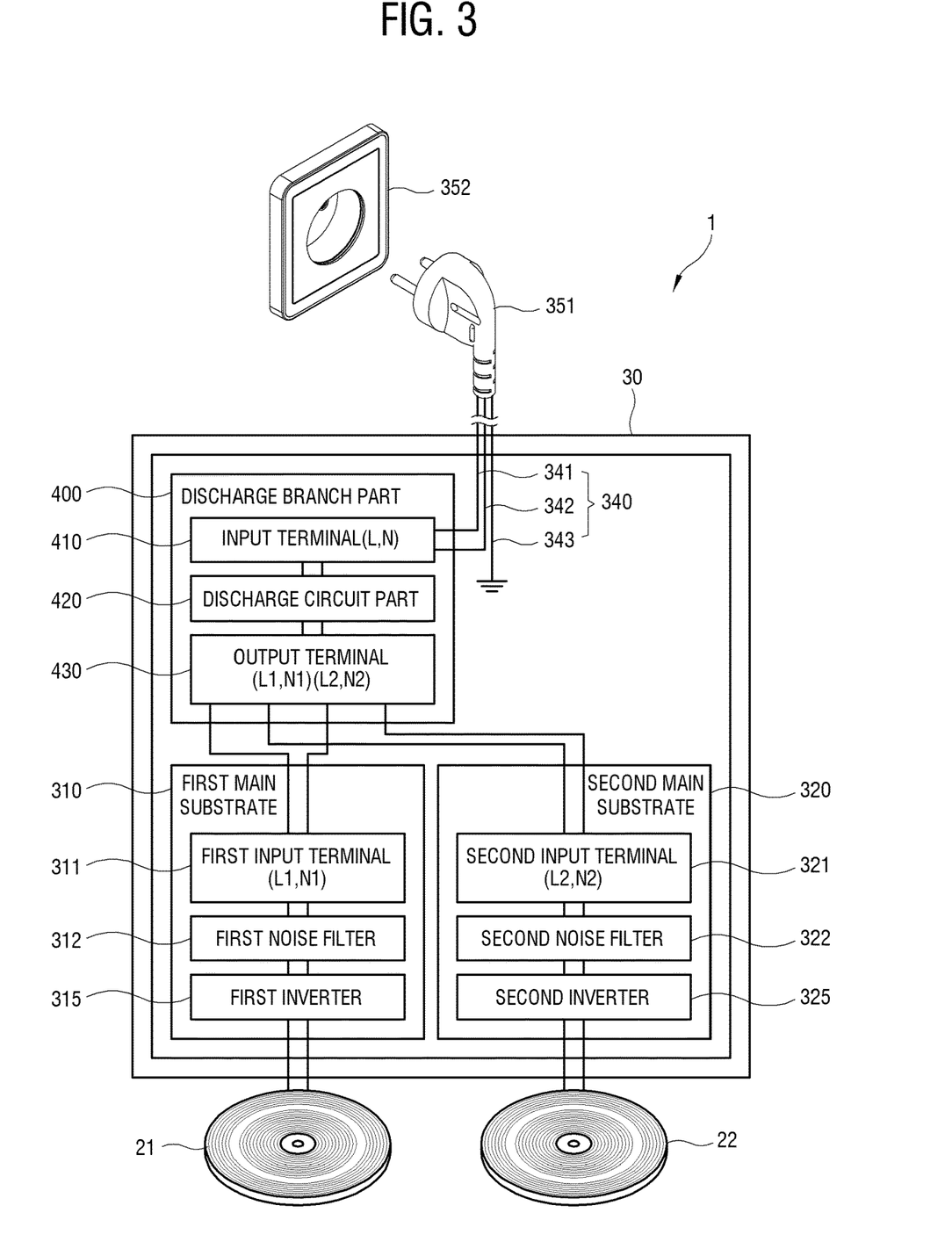
FIG. 3 is a diagram illustrating a configuration of the induction heating cooking apparatus illustrated in FIG. 2.

FIG. 3 is a diagram illustrating a configuration of the induction heating cooking apparatus illustrated in FIGS. 1 and 2. The induction heating cooking apparatus 1 illustrated in FIG. 3 further includes a plug 351 for inputting power by being connected to an outlet 352 connected to an external power supply.

The main body 30 of the induction heating cooking apparatus 1 illustrated in FIG. 3 is provided with main substrates 310 and 320 for supplying AC power input through the plug 351 to the induction coils 21 and 22. The main substrates 310 and 320 of the present embodiment include the first main substrate 310 and the second main substrate 320.

Hereinafter, each configuration of the first main substrate 310 and a process of supplying operating power to the first induction coil 21 through the first main substrate 310 will be described. Since the configuration of the second main substrate 320 is the same as or similar to that of the first main substrate 310, each configuration of the second main substrate 320 and a process of supplying operating power to the second induction coil 22 through the second main substrate 320 will be omitted.

The power input through the first input terminal 311 of the first main substrate 310 is filtered by a first noise filter 312. The first noise filter 312 may be implemented as an electro magnetic interference (EMI) filter, and may perform filtering to pass only an AC voltage and an AC current of a predetermined frequency. For example, the first noise filter 312 may have a capacitor connected in parallel to the external power supply, and may bypass noise included in the AC power received from the external power supply to the external power supply.

The first inverter 315 may supply filtered AC power as operating power of the first induction coil 21. For example, the first inverter 315 may include, but not limited thereto, a pulse width modulation (PWM) control type switch for supplying operating power.

The induction heating cooking apparatus 1 according to the present embodiment further includes a discharge branch part 400. The discharge branch part 400 may be provided on an auxiliary substrate separated from the main substrates 310 and 320 and provided in the main body 30.

Specifically, the discharge branch part 400 has an input terminal 410, a discharge circuit part 420, and an output terminal 430. However, since the discharge branch part 400 according to the embodiment of the disclosure is not limited to the components illustrated in FIG. 3, and therefore may include components other than the above components or exclude any one of the above components. For example, at least one configuration of the first noise filter 312 of the main substrate 310 may be included in the discharge branch part 400.

The input terminal 410 has an L terminal and an N terminal connected to the L line 341 and the N line 342, respectively, of 3-wire power lines 340 of the plug 351, and receives AC power from an external power supply 510 through the L terminal and the N terminal.

The output terminal 430 may have an L1 terminal and an L2 terminal branched from the L terminal of the input terminal 410, and an N1 terminal and an N2 terminal branched from the N terminal of the input terminal 410, and may supply the AC power received through the input terminal 410 to the main substrates 310 and 320, respectively. For example, the L1 terminal and the N1 terminal of the output terminal 430 may be connected to the L1 terminal and the N1 terminal of the first input terminal 311 of the first main substrate 310 to supply AC power to the first main substrate 310, and the L2 terminal and the N2 terminal of the output terminal 430 may be connected to the L2 terminal and the N2 terminal of the second input terminal 321 of the second main substrate 320 to supply AC power to the second main substrate 320.

In this way, the discharge branch part 400 may branch the external power supply through the input terminal 410 and the output terminal 430, and supply the branched external power supply to the main substrates 310 and 320, respectively.

The discharge circuit part 420 may be connected in parallel to the input terminal 410 and/or the output terminal 430 to discharge the charges charged in the capacitor of the first noise filter 312 of the first main substrate 310 when the plug 351 is disconnected from the outlet 352. That is, the discharge circuit part 420 discharges the charges charged in the capacitor, thereby satisfying the reference limit voltage for securing safety. Similarly, the discharge circuit part 420 discharges the charges charged in the capacitor of the second noise filter 322 of the second main substrate 320 when the plug 351 is disconnected from the outlet 352, thereby satisfying the reference limit voltage.

That is, since the voltage remaining in the first noise filter 312 and the second noise filter 322 and two circuits may be discharged using one discharge circuit part 420, the efficiency of the space design is improved.

As described above, the plug-type induction heating cooking apparatus 1 according to the present embodiment includes the discharge branch part 440 on the auxiliary substrate separately provided from the main substrates 310 and 320 to satisfy the reference limit voltage to secure the safety, and performs the function of a common discharge means for a plurality of circuits to secure the space efficiency.

Figure 4:
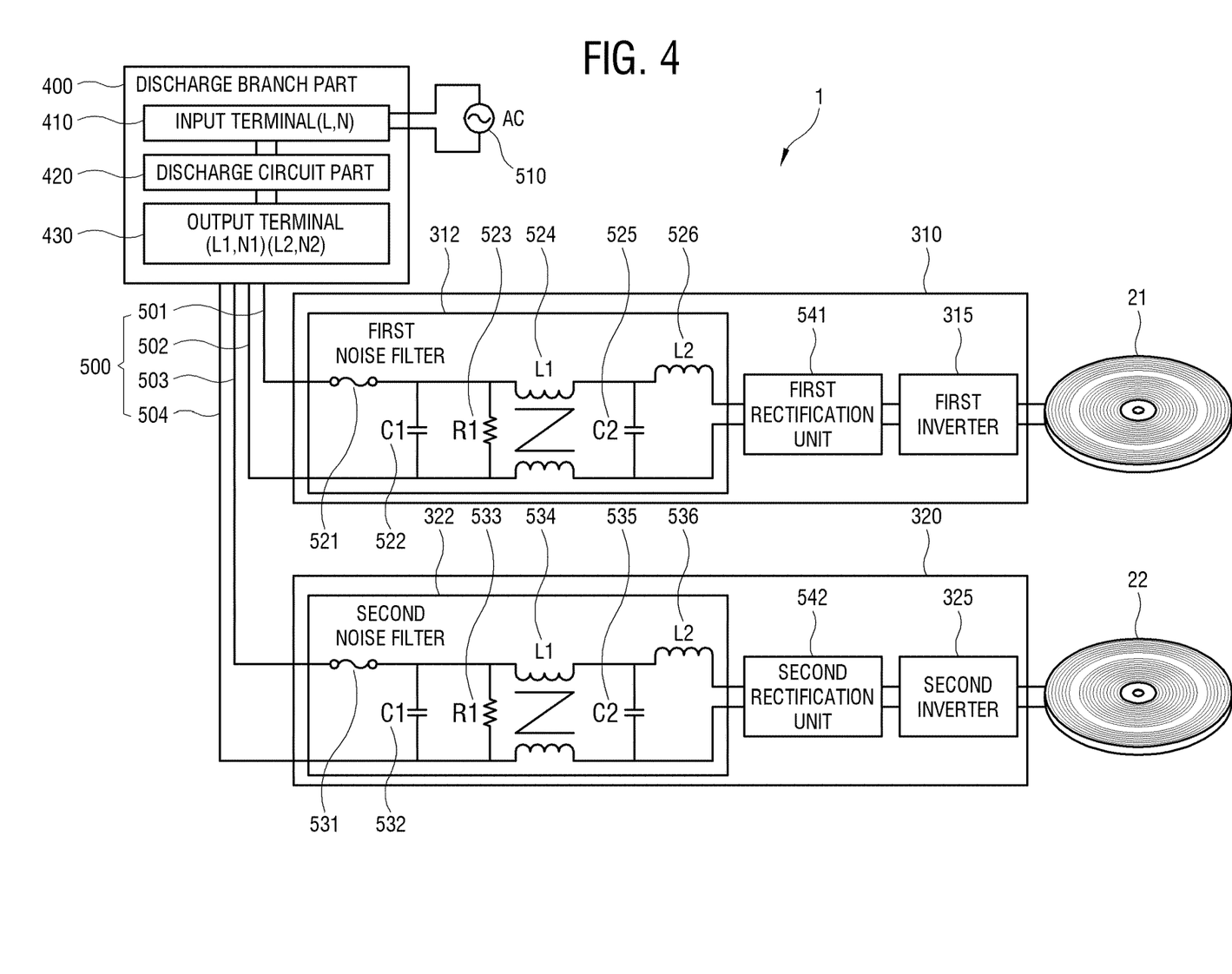
FIG. 4 is a diagram illustrating an example of a main substrate of the induction heating cooking apparatus illustrated in FIG. 3.

FIG. 4 is a diagram illustrating a configuration of the main substrate of the induction heating cooking apparatus illustrated in FIGS. 1 to 3. The main substrates 310 and 320 illustrated in FIG. 4 may be implemented as a printed board assembly (PBA), but are not limited thereto.

The first noise filter 312 of the first main substrate 310 may further include a first capacitor 522 and a second capacitor 525 connected in parallel to the external power supply 510 and a first inductor 524 and a second inductor 526 connected in series to the external power supply 510 in order to remove noise included in the AC power received through the first input terminal 311.

The first capacitor 522 and the second capacitor 525 may bypass the noise included in the AC power received from the external power supply 510 to the external power supply 510. In addition, the first inductor 524 and the second inductor 526 may block the noise included in the AC power source from passing.

When power is cut off, the charges charged in the first capacitor 522 and the second capacitor 525 may be discharged by the discharge circuit part 420. However, since the first noise filter 312 according to the embodiment of the disclosure is not limited to the components illustrated in FIG. 4, and therefore may include components other than the above components or exclude any one of the above components. For example, the first noise filter 312 may further include a first fuse 521 for blocking an overcurrent from occurring between the first noise filter 312 and the external power supply 510. In addition, the first noise filter 312 may further include a first resistor 523 connected in parallel to the first capacitor 522. The first resistor 523 may discharge the charges charged in the first capacitor 522 when power is cut off. In this case, since the first resistor 523 performs the same function as the discharge circuit part 420, in consideration of the satisfaction of the reference limit voltage, the resistance of the discharge resistor of the discharge circuit part 420 and the first resistor 523 may be set to be appropriately distributed. Alternatively, depending on the design, the first resistor 523 may be omitted, and only the discharge circuit part 420 may perform the discharge function.

Meanwhile, the first main substrate 310 may further include a first rectifying unit 541 that rectifies AC power to DC power or reduces a change in DC power to uniformly smooth the DC power. For example, the first rectifying unit 541 may include four diodes and rectifying capacitors in a full bridge type. When the first main substrate 310 includes the first rectifying unit 541, the first inverter 315 may convert the DC power rectified through the first rectifying part 541 into AC power, and supply the AC power to the first induction coil 21.

Similarly, the second main substrate 320 may include a configuration for supplying AC power to the second induction coil 22. That is, the second noise filter 322 of the second main substrate 320 may further include a third capacitor 532 and a fourth capacitor 535, a third inductor 534 and a fourth inductor 536, a second resistor 533, and the like. In addition, the second main substrate 320 may further include a second fuse 531 and a second rectifying unit 542 as necessary. Other components of the second main substrate 320 are the same as or similar to those of the first main substrate 310, and a detailed description thereof will be omitted.

The discharge branch part 400 may branch AC power supplied from the external power supply 510 and supply the branched AC power to each of the main substrates 310 and 320. The input terminal 410 receives AC power from the external power supply 510 through a 2-wire power line, and the output terminal 430 branches the 2-wire power line to the L1 power line 501 and the N1 power line 502 and the L2 power line 503 and the N2 power liner 504 to supply AC power to the first main substrate 310 through the L1 power line 501 and the N1 power line 502 and supply AC power to the second main substrate 320 through the L2 power line 503 and the N2 power line 504.

In this way, the discharge branch part 400 may branch the external power supply through the input terminal 410 and the output terminal 430, and supply the branched external power supply to the main substrates 310 and 320, respectively, thereby performing the same function as the terminal block.

Figure 5:
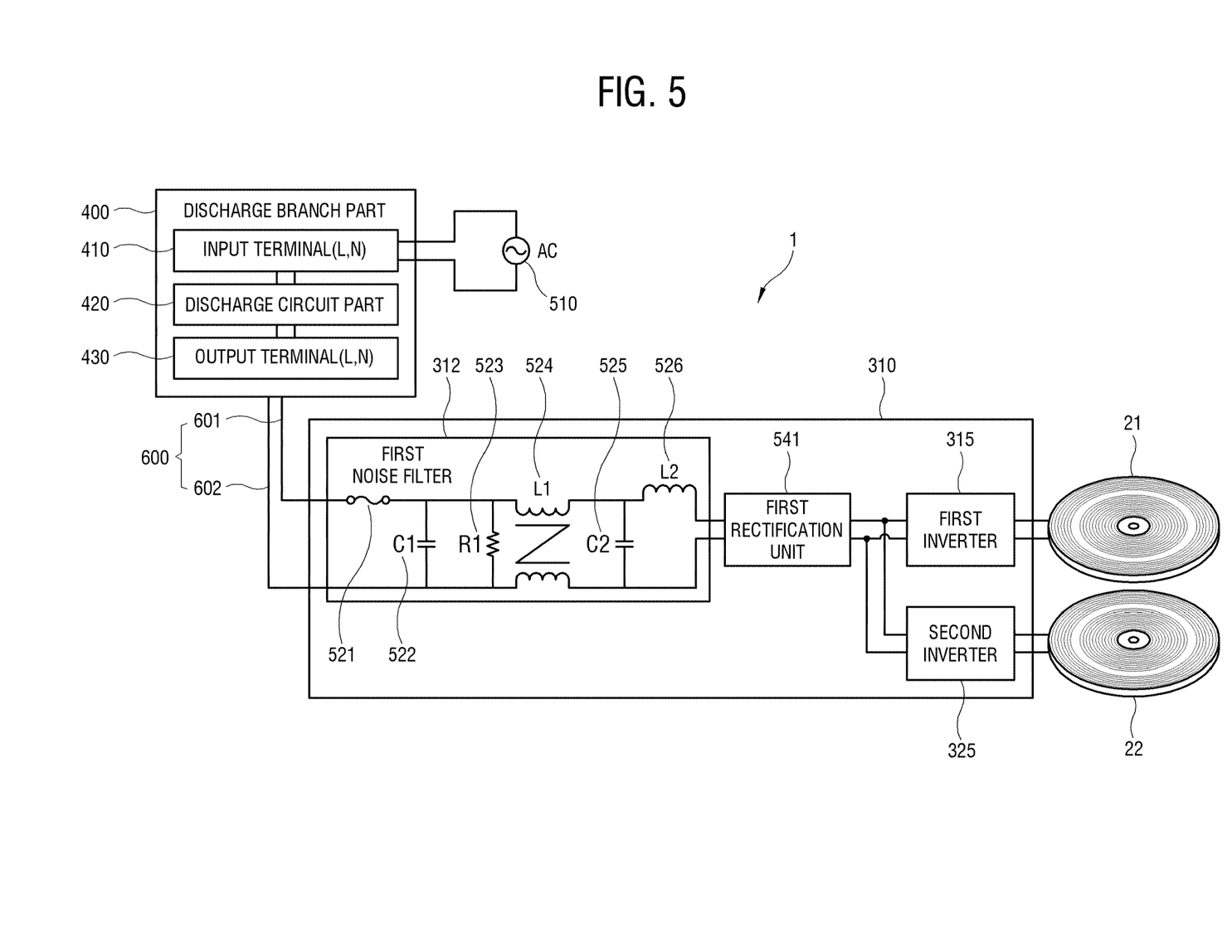
FIG. 5 is a diagram illustrating another example of the main substrate of the induction heating cooking apparatus illustrated in FIG. 3.

FIG. 5 is a diagram illustrating another example of the main substrate of the induction heating cooking apparatus illustrated in FIGS. 1 to 4. The induction heating cooking apparatus of FIG. 4 includes the first main substrate 310 and the second main substrate 320, and includes a first inverter 315 and a second inverter 325 on the first and second main substrates 310 and 320, respectively, whereas the induction heating cooking apparatus of FIG. 5 includes the first main substrate 310 and the first main substrate 310 includes the first inverter 315 and the second inverter 325.

The first main substrate 310 of FIG. 5 performs the same or similar function as the first main substrate 310 of FIG. 4. That is, the first noise filter 312 of the first main substrate 310 performs filtering on the AC power received through the first input terminal 311, branches and supplies the filtered AC power to the first inverter 315 and the second inverter 325.

When the power is cut off, the charges charged in the first capacitor 522 and the second capacitor 525 may be discharged by the discharge circuit part 420. The first noise filter 312 may further include a first resistor 523 connected in parallel to the first capacitor 522, and the first resistor 523 may discharge the charges charged in the first capacitor 522 when power is cut off. In this case, in consideration of the satisfaction of the reference limit voltage, the resistance of the discharge resistor of the discharge circuit part 420 and the first resistor 523 may be set to be appropriately distributed. Alternatively, depending on the design, the first resistor 523 may be omitted, and only the discharge circuit part 420 may perform the discharge function.

As described above, the plug-type induction heating cooking apparatus 1 according to the present embodiment includes the discharge branch part 400 on the auxiliary substrate separately provided from the main substrate 310 to satisfy the reference limit voltage to secure the safety, and includes a common filtering means to secure the space efficiency.

Figure 6:
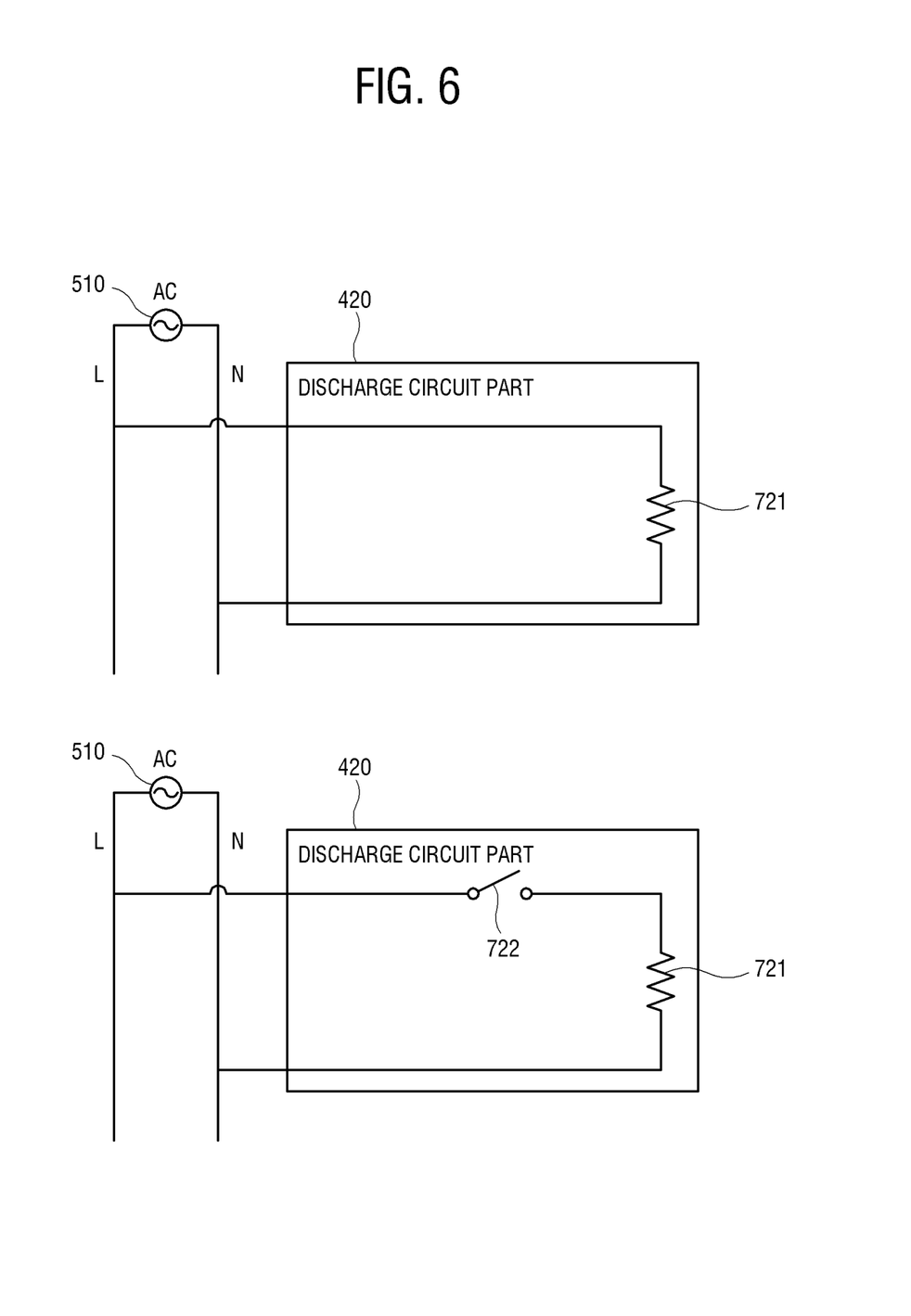
FIG. 6 is a diagram illustrating an example of a discharge circuit part of the induction heating cooking apparatus illustrated in FIG. 3.

FIG. 6 illustrates an example of the discharge circuit part of the induction heating cooking apparatus illustrated in FIGS. 1 to 5. The discharge circuit part 420 illustrated in FIG. 6 may include a discharge resistor 721 connected in parallel to the external power supply 510. The discharge resistor 721 may discharge the charges charged in the first capacitor 522 and the second capacitor 525 when the power of the induction heating cooking apparatus 1 is cut off, so the induction heating cooking apparatus 1 may satisfy the reference limit voltage. That is, the resistance of the discharge resistor 721 is set to satisfy the reference limit voltage in consideration of the capacities of the first capacitor 522 and the second capacitor 525.

In addition, the discharge circuit part 420 illustrated in FIG. 6 may further include a switching unit 722 connected in series to the discharge resistor 721. The switching unit 722 may be implemented as an integrated circuit including a transistor switch, a processor that performs switching control of the transistor switch, and the like.

The switching unit 722 is turned off in a normal situation where power is supplied to the induction heating cooking apparatus 1, and thus a current does not pass through the discharge resistor 721. On the other hand, the switching unit 722 is turned on in a situation where power is cut off, such as when the plug 351 is pulled out, and thus a current passes through the discharge resistor 721, so the charges charged in the first capacitor 522 and the second capacitor 525 are discharged by the discharge resistor 721.

However, FIG. 6 illustrates that the switching unit 722 is provided between the input terminal 410 and the discharge resistor 723, but is not limited thereto. Therefore, the switching unit 722 may be disposed in various positions capable of selectively blocking the connection between the external power supply 510 and the discharge resistor 723, such as being disposed between the discharge resistor 723 and the first noise filter 312.

As described above, according to the switching unit 722 according to the embodiment of the disclosure, the power consumption by the discharge resistor 723 occurs only in the special situation where power is cut off such as when the plug 351 is pulled out, and the power consumption by the discharge resistor 723 does not occur by turning off the switching unit 722 in the normal situation where power is supplied, and as a result, the power consumption may be minimized in the situations where the low-power operation is required, in particular, in a standby mode.

Figure 7:
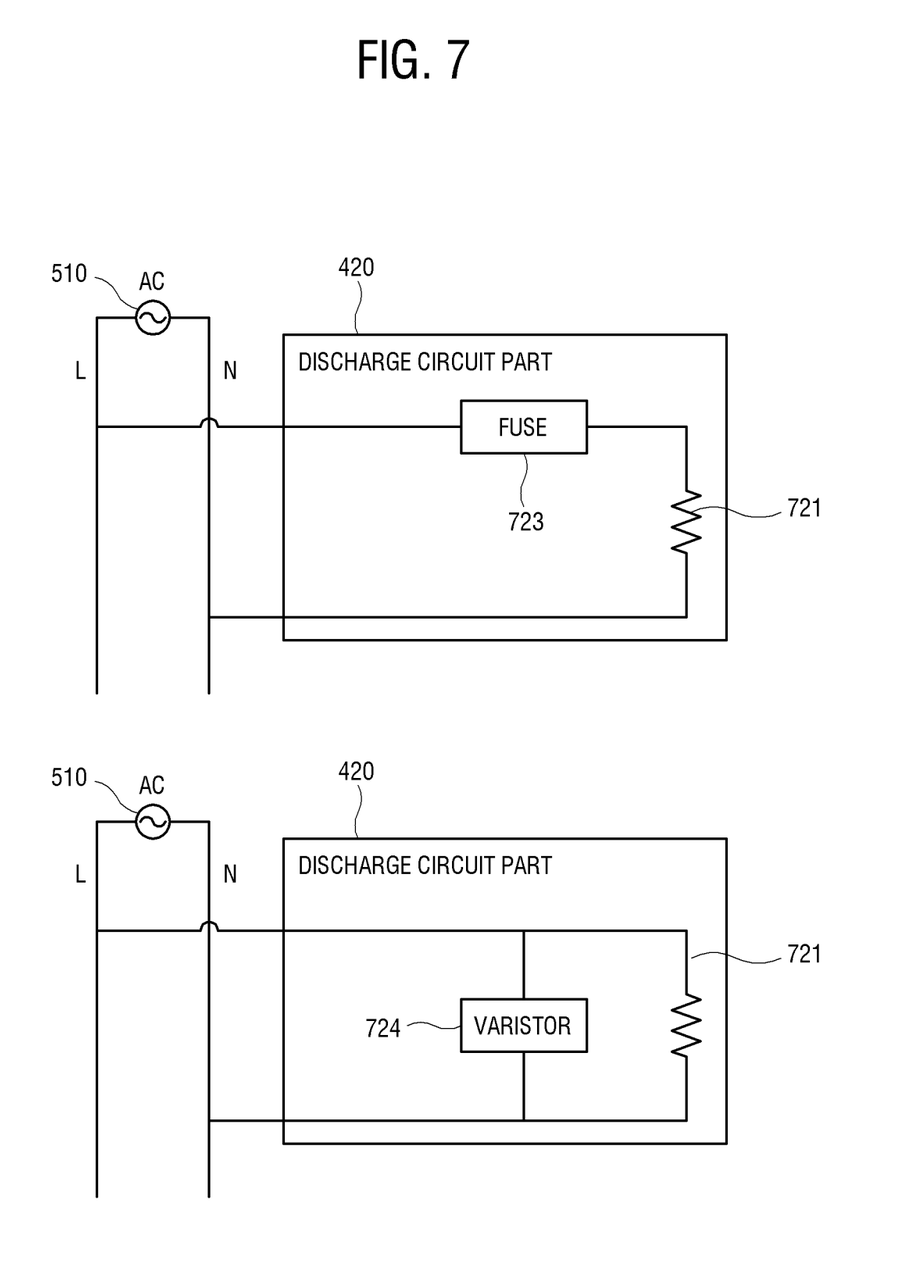
FIG. 7 is a diagram illustrating another example of the discharge circuit part of the induction heating cooking apparatus illustrated in FIG. 3.

FIG. 7 is a diagram illustrating another example of the discharge circuit part of the induction heating cooking apparatus illustrated in FIGS. 1 to 5. The discharge circuit part 420 illustrated in FIG. 7 may include a fuse 723 connected in series to the external power supply 510. The fuse 723 may protect the discharge circuit part 420 from the overcurrent applied to the discharge circuit part 420.

In addition, the discharge circuit part 420 illustrated in FIG. 7 may include a varistor 724 connected in parallel to the external power supply 510. The varistor 724 may protect the discharge circuit part 420 from the overcurrent applied to the discharge circuit part 420.

Figure 8:
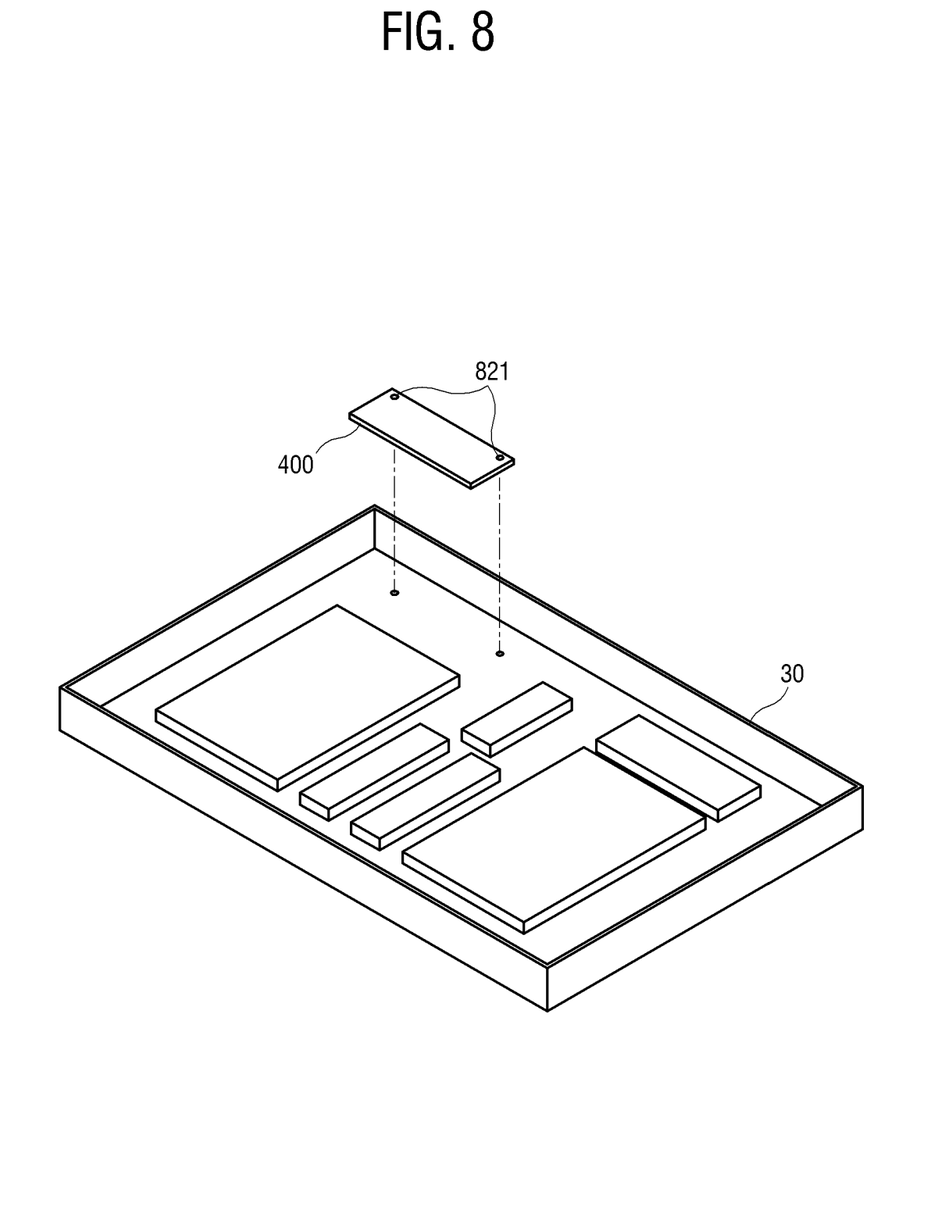
FIG. 8 is a diagram illustrating an example of a discharge branch part of FIG. 3.

FIG. 8 illustrates an embodiment of the discharge branch part of FIGS. 1 to 5. The discharge branch part 400 of FIG. 8 may be provided on an auxiliary substrate separate from the main substrates 310 and 320, and the auxiliary substrate may be fixedly provided around at least one of the main substrates 310 and 320 in the main body 30.

In particular, the auxiliary substrate 30 may further include at least one fixing hole 821 through which the fixing means for fixing the main body 30 and the auxiliary substrate penetrates. For example, as illustrated in FIG. 8, the auxiliary substrate is provided with the two fixing holes 821, and may be fixed to the main body 30 by two fixing means penetrating through the two fixing holes 821.

Figure 9:
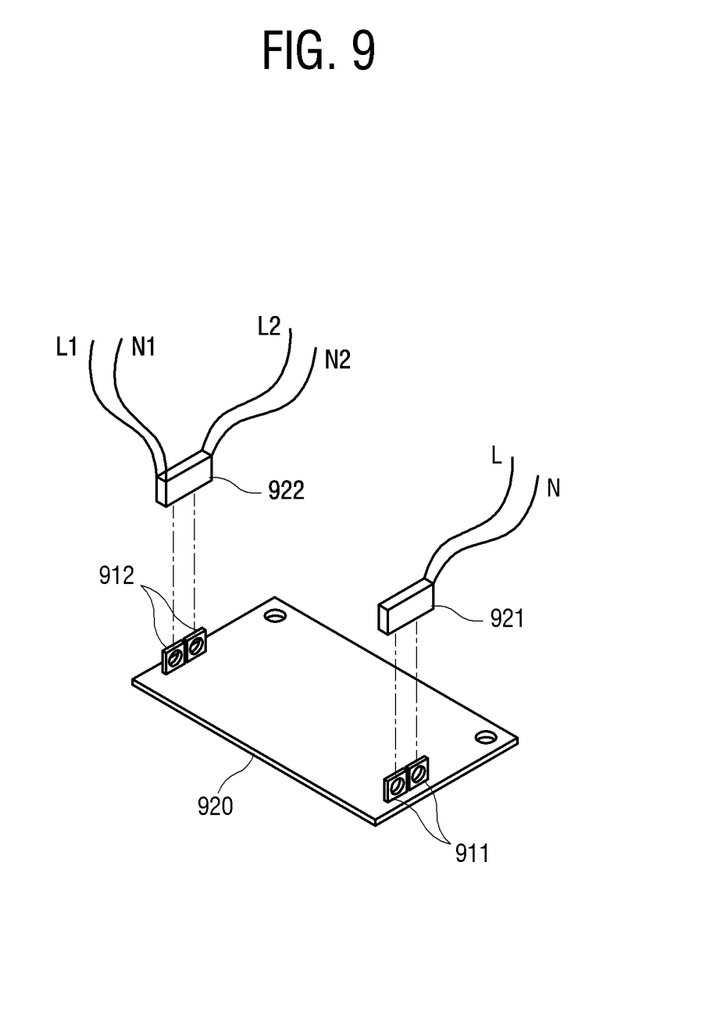
FIG. 9 is a diagram illustrating an example of an input terminal and an output terminal of the discharge branch part of FIG. 3.
Figure 10:
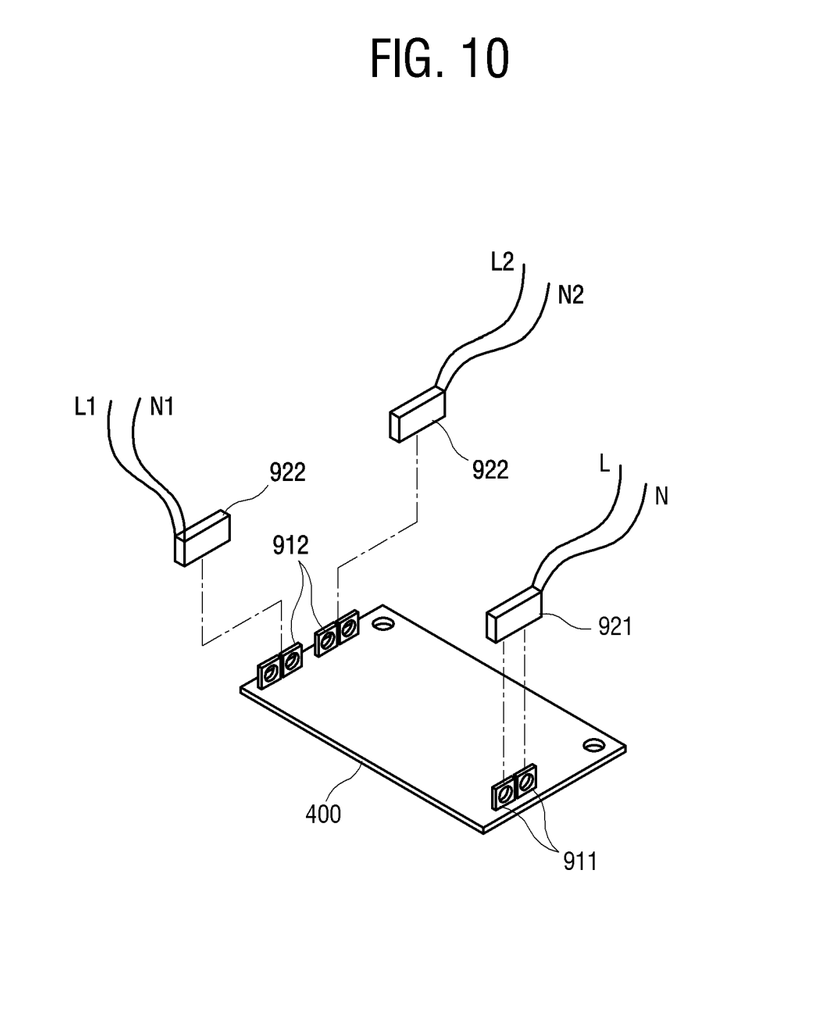
FIG. 10 is a diagram illustrating another example of the input terminal and the output terminal of the discharge branch part of FIG. 3.

FIGS. 9 and 10 illustrate an example of the input terminal and the output terminal of the discharge branch part of FIGS. 1 to 5. As illustrated in FIG. 9, the input terminal 410 of the discharge branch part 400 may be implemented as a protruding terminal 911 having an L terminal and an N terminal, and may be coupled to a receiving terminal 921 having an L line 341 and an N line 342 connected to the plug 351 in a tap coupling method. The tab connection method is a method in which the protruding terminal 911 is inserted to be accommodated in the receiving terminal 921. According to the tap coupling method, the convenience of a connection operation between both terminals 911 and 921 may be improved.

Similarly, the output terminal 430 of the discharge branch part 400 may be implemented as a protruding terminal 912 having an L1 terminal and an N1 terminal and an L2 terminal and an N2 terminal, and may be coupled to a receiving terminal 922 that is connected to a first input terminal 311 of the first main substrate 310 and a second input terminal 321 of the second main substrate 321 in the tab coupling method.

On the other hand, FIG. 10 is substantially the same as FIG. 9, but the output terminal 430 of the discharge branch part 400 has the difference in that the protruding terminal 912 having the L1 terminal and the N1 terminal is provided as a first protruding terminal and a second protruding terminal, respectively, and the receiving terminal 922 tab-coupled to the protruding terminal 912 is provided as a first receiving terminal connected to the first input terminal 311 of the first main substrate 310 and a second receiving terminal 922 connected to the second input terminal 321 of the second main substrate 321. The other components of the discharge branch part 400 are the same as or similar to those of FIG. 9, and thus a detailed description thereof is omitted.

Figure 11:
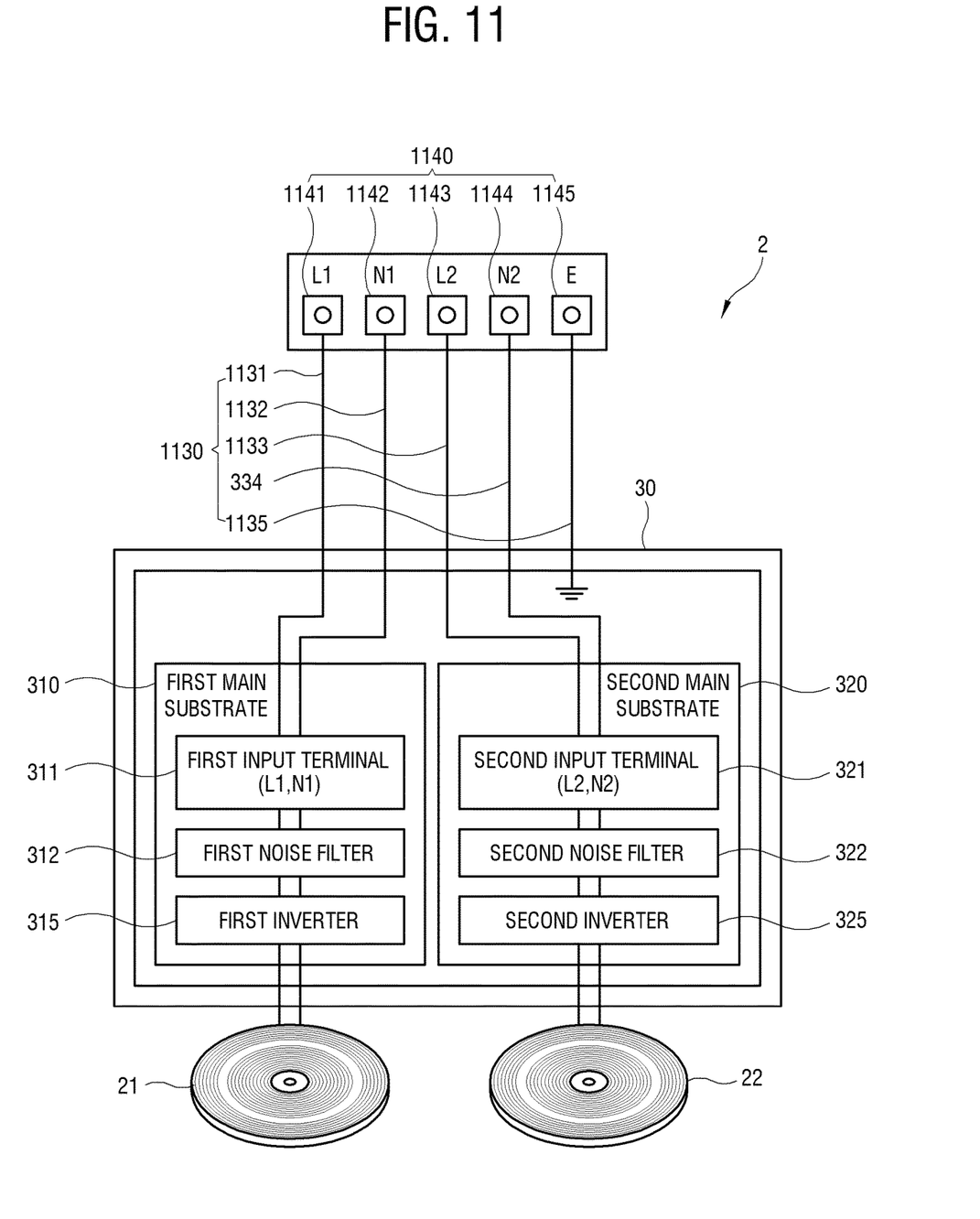
FIG. 11 is a diagram illustrating a configuration of a direct connection type induction heating cooking apparatus as a related technology of the disclosure.

FIG. 11 is a diagram illustrating a configuration of a direct connection type induction heating cooking apparatus as a related technology of the disclosure. A direct connection type induction heating cooking apparatus 2 illustrated in FIG. 11 is supplied with power by connecting a 5-wire distribution line 1130 to a distribution terminal 1140 of a switchboard connected to the external power supply. That is, the first main substrate 310 may be supplied with AC power through an L1 distribution line 1131 and an N1 distribution line 1132 connected to an L1 distribution terminal 1141 and an N1 distribution terminal 1142 of the switchboard, and the second main substrate 320 may be supplied with AC power through an L2 distribution line 1133 and an N2 distribution line 1134 connected to an L2 distribution terminal 1143 and an N2 distribution terminal 1144.

In this way, the direct connection type induction heating cooking apparatus 2 is supplied with power by directly connecting the distribution line 1130 to the distribution terminal 1140, which has already been branched, and therefore, does not necessary include a branch means that branches power into each main substrate 310 and 320 and a discharging means for securing the stability in the situation where power is cut off such as when the plug is pulled out.

Therefore, by providing the discharge branch part 400 separately from the main substrates 310 and 320, the main substrates 310 and 320 are commonly used in the plug type induction heating cooking apparatus 1 and the direct connection type induction heating cooking apparatus 2, and the discharge branch part 400 is separately designed for the plug type induction heating cooking apparatus 1, thereby securing the production, cost efficiency, and design optimization.

Hereinabove, the disclosure has been described in detail through the preferred embodiments, but the disclosure is not limited thereto and may be implemented in various ways within the scope of the claims.

What is claimed is:

1. An induction heating cooking apparatus, comprising:
    a countertop configured to have a plurality of cooking areas in which a cooking container is seatable;
    a plurality of coils configured to be provided under the countertop respectively for each cooking area of the plurality of cooking areas;
    a plurality of inverters configured to be provided on a main substrate and respectively connected to each coil of the plurality of coils;
    a plurality of noise filters configured to comprise a capacitor connected in parallel to an external power supply, respectively, and provide each inverter of the plurality of inverters with a voltage of the external power supply from which noise is removed;
    a plug configured to be connected to the external power supply; and
    an auxiliary substrate configured to be provided between the plug and the main substrate,
    wherein the auxiliary substrate comprises:
        an input terminal configured to be connected to a power supply line from the plug,
        a plurality of output terminals configured to be branched from the input terminal to correspond to a number of the plurality of noise filters, and be connected to the power supply line facing each noise filter of the plurality of noise filters, and
        a discharge circuit part configured to be provided between the input terminal and the plurality of output terminals and comprise a discharge resistor for discharging a voltage stored in the capacitor in response to a cutoff of the provided voltage of the external power supply.

2. The induction heating cooking apparatus of claim 1, wherein each noise filter of the plurality of noise filters includes a first noise filter and a second noise filter corresponding to each inverter of the plurality of inverters, and
    a power line from each output terminal of the plurality of output terminals toward each noise filter of the plurality of noise filters includes a first power line and a second power line branched and connected to the first noise filter and the second noise filter, respectively.

3. The induction heating cooking apparatus of claim 1, wherein the discharge circuit part further includes a switching unit configured to be provided between each noise filter of the plurality of noise filters and the discharge resistor and switched on in response to the cutoff of the provided voltage of the external power supply.

4. The induction heating cooking apparatus of claim 1, wherein the auxiliary substrate further includes a fuse connected in series to the discharge resistor.

5. The induction heating cooking apparatus of claim 1, wherein the auxiliary substrate further includes a varistor connected in parallel to the discharge resistor.

6. The induction heating cooking apparatus of claim 1, wherein each noise filter of the plurality of noise filters is provided on the main substrate.

7. The induction heating cooking apparatus of claim 1, wherein the plurality of noise filters is provided on the auxiliary substrate.

8. The induction heating cooking apparatus of claim 1, wherein the auxiliary substrate further includes a fixing hole, through which a fixing means for fixing the auxiliary substrate penetrates, around the main substrate.

9. The induction heating cooking apparatus of claim 1, wherein the input terminal and each output terminal of the plurality of output terminals are a tap type.

* * * * *